United States Patent
Schlafly

[11] 3,787,607
[45] Jan. 22, 1974

[54] COAXIAL CABLE SPLICE
[75] Inventor: Hubert J. Schlafly, Fort Lee, N.J.
[73] Assignee: Teleprompter Corporation, New York, N.Y.
[22] Filed: May 31, 1972
[21] Appl. No.: 258,435

[52] U.S. Cl.................. 174/88 C, 29/628, 156/49, 174/92
[51] Int. Cl............................................ H02g 15/08
[58] Field of Search .... 174/21 C, 71 C, 88 R, 88 C, 174/92, 94 R; 156/49; 29/628, 630 F

[56] References Cited
UNITED STATES PATENTS

| | | | |
|---|---|---|---|
| 3,458,648 | 7/1969 | Volker | 174/21 C X |
| 3,667,119 | 6/1972 | Cleaver et al. | 29/628 |
| 3,441,659 | 4/1969 | Laudig et al. | 174/88 C |
| 3,691,505 | 9/1972 | Graves | 29/628 |

Primary Examiner—Bernard A. Gilheany
Assistant Examiner—A. T. Grimley
Attorney, Agent, or Firm—Dean S. Edmonds et al.

[57] ABSTRACT

Coaxial cables are spliced together by laying bare a length of center conductor on one end of each cable, joining the center conductors coaxially, enclosing the joined lengths of center conductor in dielectric material of substantially the same outer diameter as the inside diameters of the outer conductors of the cables being spliced, and providing at least one layer of conductive material over the dielectric material to extend lengthwise of the cable from one outer conductor to the other and circumferentially of the cable substantially over the entire circumference thereof. The conductive material may include sections of flexible foil intimately conformable to the shape of the outer conductors of the cable in order to insure transmission of radio frequency energy across the splice, either capacitively or conductively, and it may include splints in the form of substantially semi-cylindrical shells extending from the outer conductor of one cable to that of the other and conductively connected thereto in order to insure transmission of low frequency or direct current energy across the splice.

14 Claims, 21 Drawing Figures

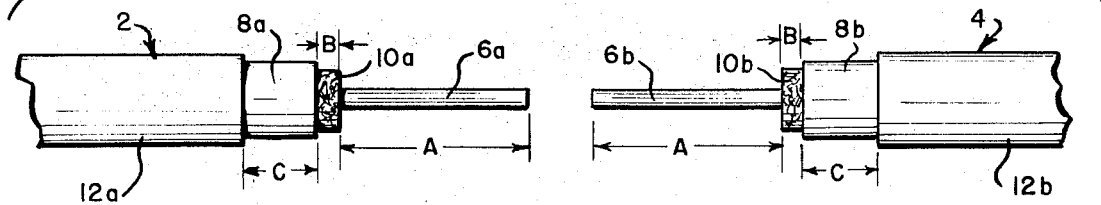
FIG. 1
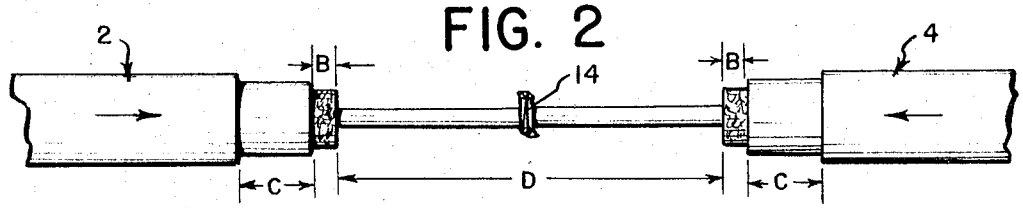
FIG. 2
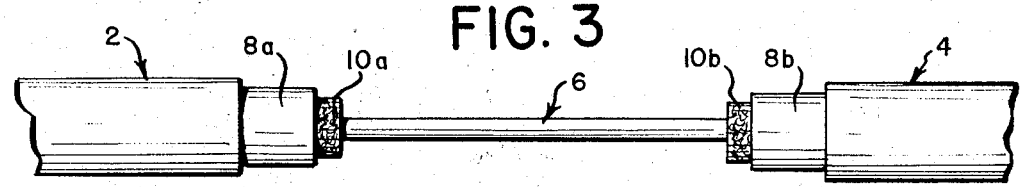
FIG. 3
FIG. 4
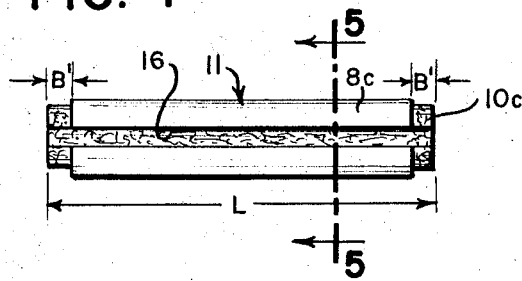
FIG. 5
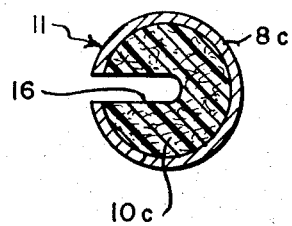
FIG. 6
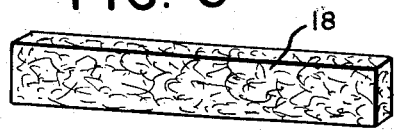
FIG. 8
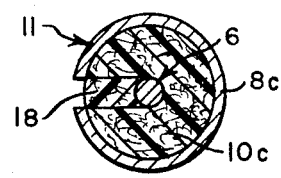
FIG. 7
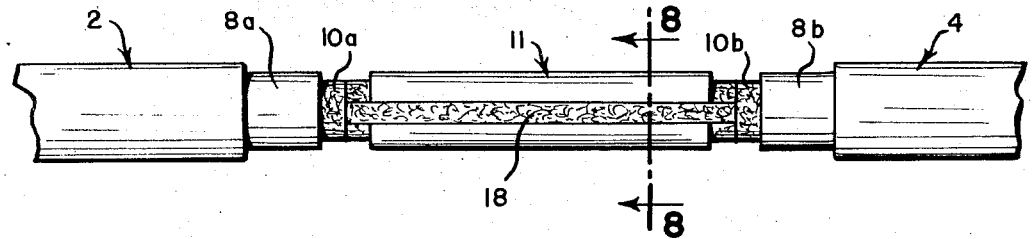

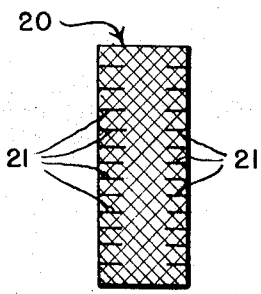
FIG. 9
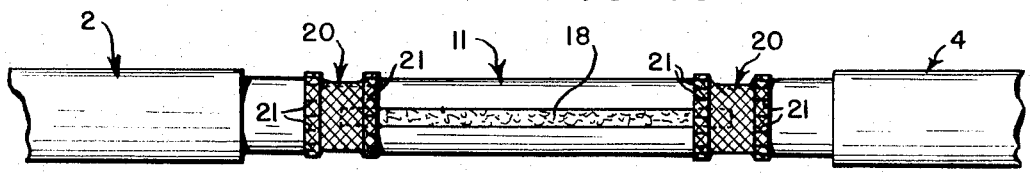
FIG. 10
FIG. 11    FIG. 11A
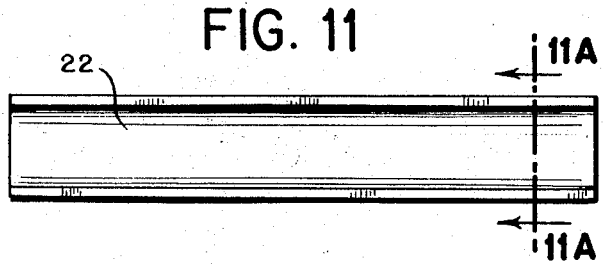 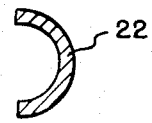
FIG. 12
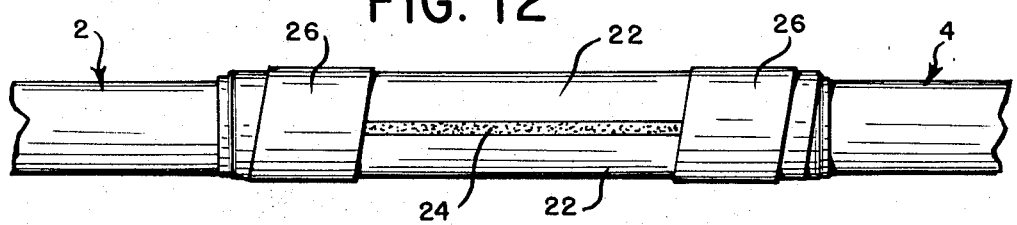
FIG. 13
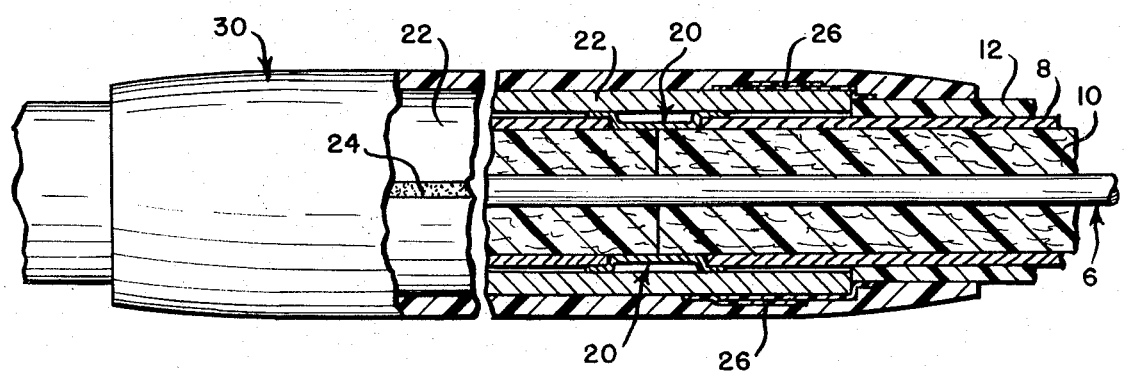

COAXIAL CABLE SPLICE

The present invention relates to splicing coaxial cables. It provides a splice, and a method of making it, which possesses mechanical and electrical properties closely matching those of the cable itself.

The invention finds applicability primarily in the splicing together of two cables of the same construction, i.e., in the splicing together of two pieces or sections of the same cable. In accordance with the invention, on the ends of the cables to be joined, the outer conductor and the interelectrode dielectric are stripped back to lay the center conductor bare. The center conductors of the two cables are then joined together coaxially, preferably by an impact or cold pressure welding process. Any irregularity at the surface of the center conductors so joined is removed. The length of bared center conductor remaining on the two joined cables is then enclosed in dielectric material extending preferably substantially 360° about the axis of the cables and out to the same diameter as the interelectrode dielectric thereof. A layer of conductive material is then applied to re-establish electrical continuity between the outer conductors of the two cables.

According to a preferred embodiment of the invention, the outer conductor is stripped back on the ends of the cables to be joined to a slightly greater distance than the interelectrode dielectric. Moreover, the dielectric material employed to enclose the bared center conductors of the joined cables is made up from a section of the cable itself with the outer conductor stripped back from each end of that section, the section having been moreover slotted lengthwise and the center conductor having been removed therefrom. Electrical continuity for high frequency currents is established by wrapping flexible conductive foil at each end of that section to extend from the outer conductor of the cable to the outer conductor on that section. Additionally, for electrical continuity at low frequencies and at direct currents and for mechanical strength, the section is enclosed in a pair of substantially semi-cylindrical metallic shells extending between and engaging the exterior surface of the outer conductors and adhered thereto with a conductive adhesive. To prevent the ingress of high frequency energy into the spliced cable, or the egress of high frequency therefrom, the clearances between these shells are substantially filled with conducting material, preferably in the form of metallic powder suspended in a hardenable adhesive vehicle.

BRIEF DESCRIPTION OF THE DRAWINGS

The invention will now be further described in terms of a number of presently preferred embodiments and with reference to the accompanying drawings in which FIGS. 1 to 13 and FIGS. 14 to 20 illustrate two splices according to the invention, and more particularly in which:

FIG. 1 is a view of the ends of two coaxial cables to be spliced together in accordance with the invention, the ends having been prepared in accordance with the initial steps of the method according to the invention;

FIG. 2 is a view of the coaxial cable ends of FIG. 1 with the center conductors thereof welded together;

FIG. 3 is a view similar to that of FIG. 2, except that the flashing at the weld has been removed;

FIG. 4 is a view in side elevation of a dielectric and outer conductor splice section forming part of the cable splice of the invention;

FIG. 5 is a sectional view taken on the line 5—5 of FIG. 4;

FIG. 6 is a perspective view of a strip of dielectric material constituting part of the splice of the invention;

FIG. 7 is a view of the joined cable ends of FIG. 3 with the splice section of FIG. 4 and dielectric strip of FIG. 6 assembled thereto;

FIG. 8 is a sectional view on the line 8—8 of FIG. 7;

FIG. 9 is a fragmentary view of a conductive tape constituting an element of the splice of the invention in preferred embodiments thereof;

FIG. 10 is a view of the structure shown in FIG. 7 with the conductive tape of FIG. 9 applied at each end of the splice section of FIG. 4 to provide radio frequency continuity across the splice;

FIG. 11 is a view of one of two substantially semicylindrical metallic shells employed in a preferred embodiment of the splice of the invention to provide electrical continuity across the splice for direct current or for low frequency electrical currents;

FIG. 11A is a sectional view taken on the line 11A—11A of FIG. 11;

FIG. 12 is a view of the spliced cable ends of FIG. 10 with two shells according to FIG. 11 applied thereto;

FIG. 13 is a view partly in axial section of the finished splice of the invention according to a preferred embodiment thereof;

FIG. 14 is a view similar to that of FIG. 1, illustrating however the ends of the two coaxial cables to be spliced according to a modified embodiment of the invention and after performance of preliminary steps thereon;

FIG. 15 is a perspective view of one of the cable ends of FIG. 14 after the performance of a further step thereon together with the tool by means of which that step is performed;

FIG. 16 is a perspective view of the cable ends of FIG. 14 after performance thereon of the step illustrated in FIG. 15 and after welding together of the center conductors of the two cable ends;

FIG. 17 is a view similar to FIG. 16, the flashing at the weld having however been removed and further showing application to the joined cable ends of the dielectric halves of a dielectric and outer conductor splice section forming part of the splice of the invention in the embodiment of FIGS. 14 to 20;

FIG. 18 is a view similar to that of FIG. 17 showing however application to the joined cable ends of the two outer conductor halves of the splice section;

FIG. 19 is a view similar to that of FIG. 18 showing the outer conductor halves of the splice in place; and FIG. 20 is a view of the finished splice with a shrink tube applied thereover.

DESCRIPTION OF THE PREFERRED EMBODIMENTS

Figure 14:
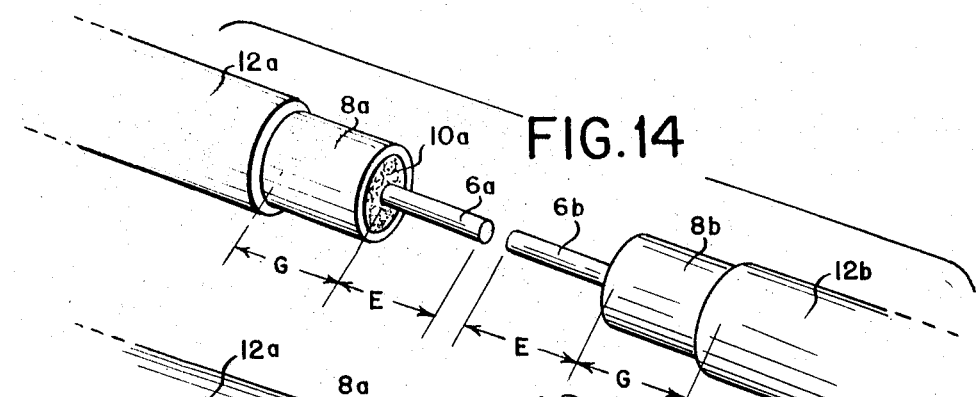

In FIG. 1 the two cable ends to be joined are generally indicated at 2 and 4. They are preferably the ends of two sections or pieces of cable of the same mechanical and electrical characteristics. Each comprises a center conductor 6, usually in the form of a wire, of copper for example, an outer conductor 8 which may be in the form of a tube, of aluminum for example, and an annular dielectric 10 for maintaining the inner and outer conductors in coaxial insulated relation. The dielectric may be of a material such as polyethylene, either foamed or solid. The cable may in addition include an outer protective jacket 12 of a material such as polyethylene for protection of the outer conductor from corrosion and for other purposes. In certain of the figures including FIG. 1, the elements of the cable ends to be joined are identified by the reference characters 6, 8, 10 and 12 with letter suffixes a and b, for the left- and right-hand cable ends.

To prepare the cable ends for splicing, the jacket 12, inner conductor 8 and dielectric 10 are stripped away on each cable end down to the center conductor 6 for a distance A which may be of the order of an inch or more and which is desirably preset at a value slightly greater than one-half the overall length L of the splice section of outer conductor and dielectric shown in FIGS. 4 and 5 and there generally indicated at reference character 11. The jacket 12 and outer conductor 8 are stripped away on each cable end down to the dielectric 10 for an additional distance B which may for example be of the order of one-eighth of an inch. The jacket 12, if present, is stripped away on each cable end down to the outer conductor 8 an additional distance C which may for example be of the order of ½ inch.

Stripping back of the cable ends as illustrated in FIG. 1 may advantageously be done with a tool which automatically establishes the dimensions A, B and C to the same preset values on both cable ends.

With the cable ends prepared as illustrated in FIG. 1, the center conductors 6a and 6b thereof are joined together coaxially by cold pressure welding. The resulting joined cable ends are illustrated in FIG. 2. In such cold pressure welding, the conductors 6a and 6b are gripped in two sets of jaws of a tool and these ends are forced together coaxially under heavy pressure, until the metal at the contact point is upset and flows radially outward. This step may be repeated one or more times to secure a cold weld bond between metal of the two conductors uncontaminated by moisture, oxides and dirt present on the surface of the conductors as initially presented to each other. In the process, the bared portion of the center conductor on each of the two cable ends is slightly shortened, so that on the joined cable ends shown in FIG. 2 there remains a preset, known length D of bared center conductor, two preset known lengths B of bared dielectric 10, and two preset, known lengths C of outer conductor 8. The length D is substantially equal to the length L of the splice section, but may advantageously be slightly less than the length L, to insure a tight fit when the splice section is applied over the center conductor of the joined cable ends, as in FIG. 7.

The welding process leaves an excrescence or flashing 14 (FIG. 2) which is then removed, producing a substantially smooth and continuous center conductor across the splice in process of formation, as indicated in FIG. 3.

The splice includes a splice section of the dielectric and outer conductor, illustrated in FIGS. 4 and 5 and there generally indicated at reference character 11. This splice section is preferably made up from a section of cable of the same mechanical and electrical properties as the cable ends to be joined. From such a section of cable the splice section includes the dielectric and the outer conductor, identified at 10c and 8c respectively in FIGS. 4 and 5, slotted lengthwise at 16 (FIG. 5) and with the center conductor removed and with the outer conductor stripped back at each end a distance B', which may be the same as the distance B.

The splice section 11 is pushed over the center conductor of the joined cable ends of FIG. 3 into the position shown therefor in FIG. 7 and the slot 16 is advantageously filled with a wedge or strip 18 of dielectric as illustrated in FIG. 6. FIG. 8 shows in cross-section the center conductor of the joined cable ends together with the splice section 11 and dielectric strip 18 in position on the cable.

Coaxial cables are typically employed to carry high frequency currents, for example for the transmission of radio, f.m. sound or television signals, at frequencies extending from hundreds of kilocycles per second up to hundreds of megacycles per second and beyond. Such frequencies will be hereinafter collectively referred to as radio frequencies. Electric power is often frequently transmitted simultaneously over such cables, either in the form of direct current or at frequencies of the order of hundreds of cycles per second or less. Such frequencies together with the zero frequency of direct current will hereinafter be referred to as power frequencies. The splice must provide electrical continuity, as nearly as practically may be, for both types of currents.

For electrical continuity at radio frequencies the splice of the invention employs in a preferred embodiment a flexible metallic foil or tape to join, at each end of the splice section 11, the outer conductor 8a 8b of the adjacent cable end to the outer conductor 8c of the splice section. A conducting tape 20 so applied is shown in FIG. 10 of the drawings. Advantageously the tape is slit for a short distance from each edge, at close intervals, as indicated at 21 in FIG. 9 to permit the tape to be applied to the adjacent outer conductor sections 8a and 8c, at the left end of the splice and to the adjacent outer conductor sections 8b and 8c at the right end of the splice, while fitting closely over the dielectric material 10 of smaller outer diameter between those outer conductor sections.

The tape 20 may be of aluminum for example. It may bear an adhesive backing, for example a pressure-sensitive adhesive, which may advantageously moreover be electrically conductive. The tape is readily deformable so as to conform closely to the surfaces against which it is applied. The tape and its conductive adhesive may provide a low resistance path for the flow of low frequency currents from the outer conductor 8a to the outer conductor 8b. Even however without completion of such a low resistance path, the tape will together with the center conductor of the splice perform by capacitive coupling the function of permitting propagation of radio frequency currents across the splice.

To provide a low resistance path across the splice for low frequencies, and additionally to provide mechanical strength for the splice, semi-cylindrical or substantially semi-cylindrical metal shells or splints 22 as illustrated in FIG. 11 are applied over the splice of FIG. 10, as illustrated in FIG. 12. To insure a permanent low resistance contact between these shells or splints and the outer conductors 8a, 8b and 8c, the inside surfaces of the splints are preferably coated with freshly mixed conductive epoxy before being assembled to the splice. To prevent the escape of radio frequency energy from inside the cable and more particularly to prevent penetration of radio frequency energy into the cable from the outside thereof, the seams or spaces between the two shells 22 are advantageously filled with conducting material, for example in the form of an adhesive loaded with metallic particles, as indicated at 24 in FIG. 12. The shells 22 may be held in place at each end, at least until the adhesive (such as an epoxy) cures, by a wrapping 26 of pressure-sensitive adhesive tape, made of vinyl for example.

To provide mechanical protection to the splice, a shrink tube 30 may be applied. The tube is slipped over one of the cable ends before the center conductors are joined and after the splice has been completed to the stage illustrated in FIG. 12, the tube is moved over the splice and shrunk down by the application of heat.

Figure 15:
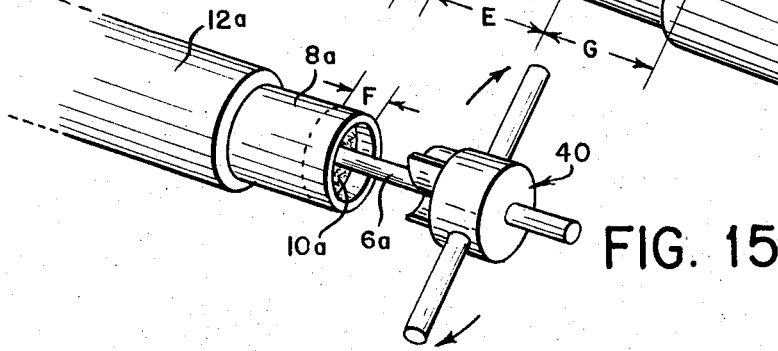
Figure 16:
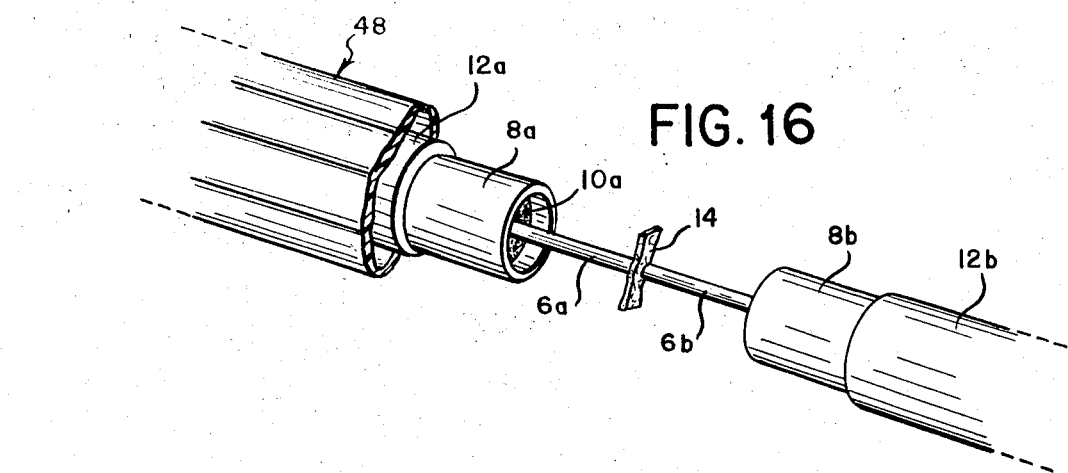
Figure 17:
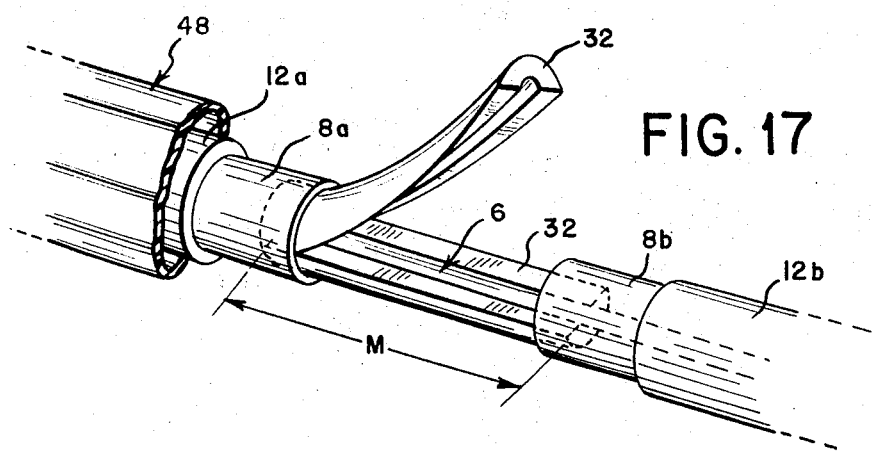
Figure 18:
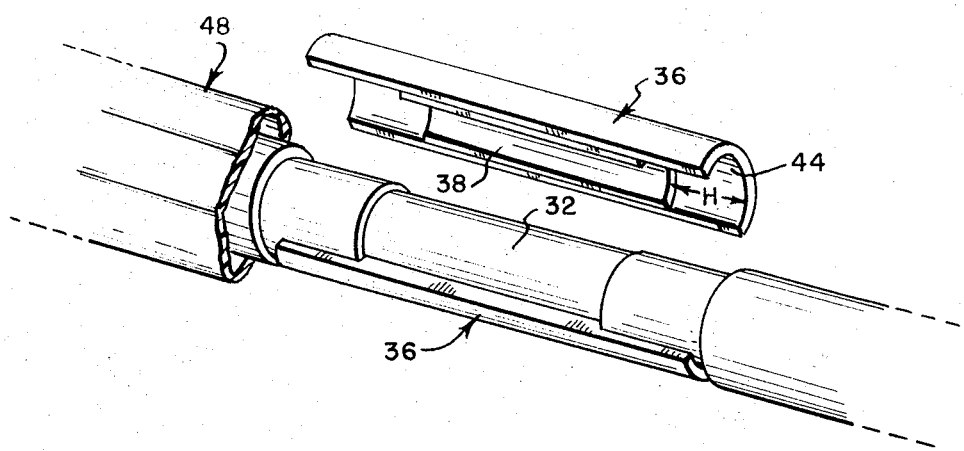
Figure 19:
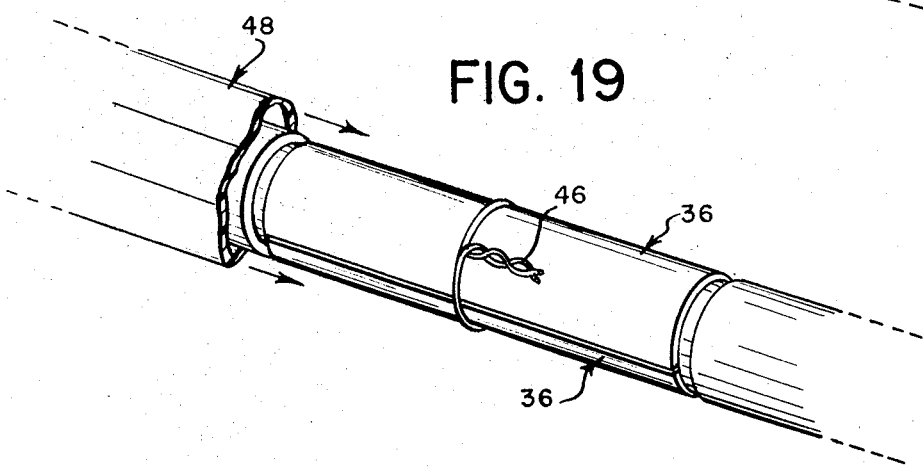

FIGS. 14 through 20 illustrate another embodiment of the splice of the invention. In this embodiment there are employed in place of the splice section 11 of FIG. 4 and shells 22 of FIG. 11, dielectric shells 32 as illustrated in FIG. 17, and metallic shells 36 as illustrated in FIGS. 18 and 19.

In making the splice of FIGS. 14 to 20, the jacket 12, outer conductor 8 and dielectric 10 are stripped away on each cable end down to the center conductor 6 for a distance E which may be of the order of an inch or more and which is desirably preset at a value slightly less than one-half the overall length M of the dielectric splice shells 32 shown in FIG. 17. The dielectric 10 is then undercut or excavated from between the inner and outer conductors 6 and 8 on each cable end as indicated in FIG. 15 to a depth F which may be of the order of a quarter of an inch or less. This undercutting may be done with the aid of a tool 40 having a plurality of blades extending from a hub which can be slipped over the center conductor of each cable end.

The jacket 12 is stripped back on each cable end down to the outer conductor 8 for a distance G additional to the distance E, which distance G may be of the order of ½ inch for example, and is desirably preset at a value equal to or greater than the length H of the shoulder on the outer conductor splice shells 36 of FIG. 18.

The cable ends are then joined at their center conductors by cold pressure welding or a similar process to produce the result illustrated in FIG. 16. Upon removal of the flashing 14 there may be inserted over the center conductor of the joined cable ends and under the outer conductor 8 thereof two substantially semi-cylindrical dielectric splice shells 32, shown in FIG. 17. The length M of these shells is substantially equal to twice the sum of the lengths E and F of FIGS. 14 and 15, less the shrinkage of the length E of the center conductors of the two cable ends occurring during the welding process. The shells 32 have the same inner and outer diameters as the dielectric 10 of the cable ends being spliced and may advantageously be made from a section of that cable by removal of the inner and outer conductors therefrom and by splitting the dielectric 10 of such a section along an axial plane.

To provide electrical continuity across the splice of FIGS. 14 to 20 for both radio and power frequencies, and also for mechanical strength of the splice, the embodiment of those figures employs substantially semi-cylindrical metallic shells 36 having an overall length substantially equal to 2E + 2G. These shells may include a central portion 38 of inner diameter substantially matching the outer diameter of the cable dielectric and hence of the dielectric shells 32, and having a length adapted to fit between the adjacent ends of the outer conductors 8a and 8b, as shown in FIG. 18. The central portion 38 thus has a length substantially equal to 2E less the shrinkage occurring during the welding process last referred to. The end portions or shoulders 44 on the shells 36 have an inside diameter equal to the outside diameter of the cable outer conductors 8a and 8b, and extend from each end of the central portion 38 a distance H substantially equal to the length G for contact with the outer surface of the outer conductors 8a and 8b on the two cable ends being joined. Conductive adhesive may be applied to improve conduction at both radio and power frequencies, and to provide the mechanical bond between the outer conductor on each cable end and the metallic shells 36. Such adhesive, for example a conductive epoxy, may also be used to fill the two longitudinal slits between the shells 36, in order to seal the assembly from the entrance or exit of radio frequency energy.

Figure 20:
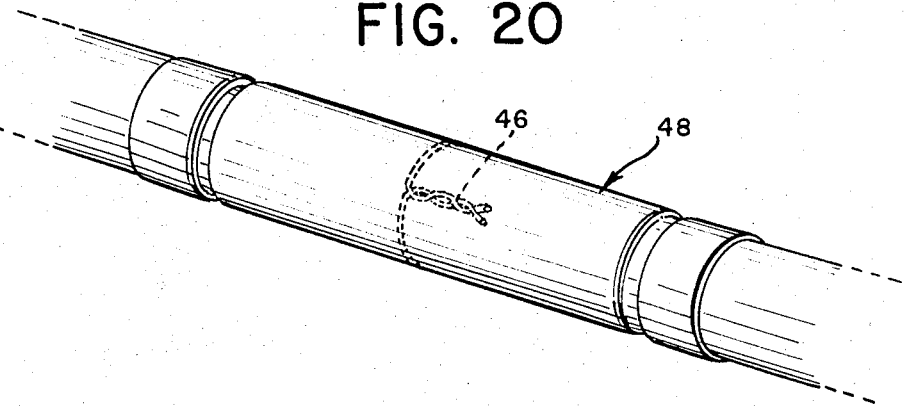

The metallic shells 36, applied to the cable ends as shown in FIG. 18, may be bound down with one or more loops of wire, as indicated at 46 in FIG. 19. Thereafter a shrink tube 48, slipped over one cable end before welding together of the center conductors, may be moved over the splice and shrunk down by the application of heat to produce a finished splice, as illustrated in FIG. 20.

While the invention has been described hereinabove in terms of a number of presently preferred embodiments of the splice thereof and of the method thereof, the invention itself is not limited thereto. For example in the embodiment of FIGS. 1 to 13, the slot 16 in the splice section 11 need not be as wide as the diameter of the inner conductor, as it is shown to be in FIG. 5. A very thin slit can be used instead. While this requires that the splice section 11 of FIGS. 4 and 5 be mechanically distorted when it is forced over the butt-joined center conductors of the two cable ends, it eliminates the need for the dielectric wedge 18 and results in a narrower gap in the outer conductor 8c of the splice section. The splice section 11 may indeed be composed of two half sections fitted to the joined inner conductors of the cable ends, with the half sections held in place by suitable mechanical means such as the wrappings 26 of FIG. 12 and conductive adhesive as in the case of the semi-cylindrical shells 36 of the embodiment of FIGS. 14 to 20. In the embodiment of FIGS. 1 to 13, the conductive tape 20 may surround the splice section over the entire length thereof, in order to close the gap in the outer conductor on the splice section.

More generally, the invention comprehends all modifications of and departures from the embodiments and methods hereinabove set forth properly falling within the scope of the appended claims.

I claim:
1. The method of splicing two coaxial cables which comprises the steps of:
   a. stripping back the outer conductor and interelectrode dielectric on one end of each cable to bare the center electrode thereof,
   b. joining coaxially the bared center conductors of the two cables,
   c. substantially enclosing the bared joined center conductors of the two cables in replacement dielectric material of substantially the same outer diameter as the outer diameter of the interelectrode dielectric of said cables, and
   d. applying over said replacement dielectric material a layer of conductive material extending substan- tially over the entire periphery and length of said replacement dielectric material and into contact with the outer conductors of said cables.

2. The method of claim 1 wherein said applying step comprises applying a relatively rigid conductive sheet to said replacement dielectric material over less than the separation of the outer conductors of said cables and further applying a relatively flexible conductive sheet at each end of said relatively rigid conductive sheet in close physical conformity with the outer conductor of one of said cables and with said relatively rigid conductive sheet.

3. The method according to claim 1 wherein said applying step comprises applying a relatively rigid conductive sheet to said interelectrode dielectric and to the outer conductors of said cables.

4. The method of claim 1 wherein said joining step comprises cold pressure welding said bared center conductors together.

5. The method according to claim 1 wherein said joining step comprises butt welding said bared center conductors together.

6. The method according to claim 1 wherein said two cables include identical interelectrode dielectric and wherein said replacement dielectric material is the same material as said interelectrode dielectric.

7. A coaxial cable splice comprising a replacement dielectric substantially enclosing a length of bared butt-joined center conductor at the end of each of the spliced cables, said replacement dielectric having substantially the same outer diameter as the interelectrode dielectric of said spliced cables, said splice further comprising a layer of conductive material extending from the outer conductor on one of said cables to the outer conductor on the other of said cables and having over said replacement dielectric an inner diameter substantially equal to the outer diameter of said replacement dielectric.

8. A coaxial cable splice according to claim 7 wherein said layer comprises a section of coaxial cable outer conductor of lesser length than the separation of the outer conductors on said spliced cables and a conductive foil wrapped at each end of said section in contact with said section, with said replacement dielectric, and with the outer conductor of one of said spliced cables.

9. A coaxial cable splice according to claim 7 wherein said layer comprises two substantially semi-cylindrical shells of relatively rigid conductive material of greater length than the separation of the outer conductors on said spliced cables and having over the length of said replacement dielectric an inner diameter substantially equal to the outer diameter of said replacement dielectric and over the remainder of the length thereof an inner diameter substantially equal to the outer diameter of the outer conductors of said spliced cables.

10. A coaxial cable splice according to claim 7 wherein said spliced cables include identical interelectrode material and wherein said replacement dielectric is made of the same material as the interelectrode dielectric of said spliced cables.

11. A coaxial cable splice according to claim 7 wherein said layer extends in overlapping relation with the outer conductors of said spliced cables, said splice including a conductive adhesive between said layer and the outer conductors of said spliced cables in the region of said overlapping relation.

12. A coaxial cable splice comprising a section of the cable to be spliced slotted lengthwise and with the center conductor removed, said section substantially enclosing a length of bared butt-joined center conductor at the end of each of the spliced cables, said splice further comprising a conductive foil wrapped at each end of that section to conform to the outer conductor of that section and to the outer conductor of the adjacent cable end, and a pair of substantially semi-cylindrical metallic shells extending from the outer conductor of one of said cable ends to the outer conductor of the other.

13. A coaxial cable splice according to claim 12 including conductive adhesive material at the joints between said metallic shells.

14. A coaxial cable according to claim 12 including a conductive adhesive between said metallic shells and the outer conductors of said cable ends.

* * * * *